United States Patent [19]

Snyder et al.

[11] 3,787,197
[45] Jan. 22, 1974

[54] APPARATUS FOR INTRODUCING MEASURED VOLUMES OF GASES TO INTERIORS OF GLASS CONTAINERS

[75] Inventors: Herbert C. Snyder; Urbano J. DeSantis, both of Brockway, Pa.

[73] Assignee: Brockway Glass Company Inc., Brockway, Pa.

[22] Filed: Sept. 2, 1971

[21] Appl. No.: 177,380

[52] U.S. Cl. .................... 65/260, 65/264, 137/625, 222/3, 222/451
[51] Int. Cl. ......................... C03b 9/00, C03b 9/44
[58] Field of Search ...... 65/260, 264; 222/451, 453, 222/3; 137/625.66

[56] References Cited
UNITED STATES PATENTS

| 1,869,920 | 8/1932 | Soubier | 65/260 |
| 2,373,435 | 4/1945 | Torigian | 222/451 |
| 1,053,816 | 2/1913 | Hughes | 222/453 |
| 2,634,552 | 4/1953 | Woolling | 137/625.66 |
| 658,915 | 10/1900 | Jacobsen | 137/625.66 |
| 857,674 | 6/1907 | Riecke | 141/372 |
| 703,874 | 7/1902 | White | 141/372 |
| 2,182,166 | 12/1939 | Berthold | 65/260 |

Primary Examiner—Robert L. Lindsay, Jr.
Assistant Examiner—Kenneth M. Schor
Attorney, Agent, or Firm—Conrad Christel et al.

[57] ABSTRACT

The takeout mechanism for a glass container forming machine has an operating rod movable axially toward the container to engage the takeout mechanism with the container at the final mold of the forming machine. This rod comprises a treatment gas conduit and is extended to project into the container when the takeout mechanism is in gripping engagement with the container. Valve means are provided for supplying a measured quantity of treatment gas under pressure to the conduit while the same is projected into the container during a takeout operation. The measured quantity is supplied to the conduit by making equal the pressure in an accumulator of gas and a pressure source by way of the valve means, and then allowing the gas to pass from the accumulator to the conduit.

5 Claims, 3 Drawing Figures

INVENTORS
HERBERT C. SNYDER
BY URBANO J. DeSANTIS

Christel + Bean
ATTORNEYS

3,787,197
SHEET 2 OF 2
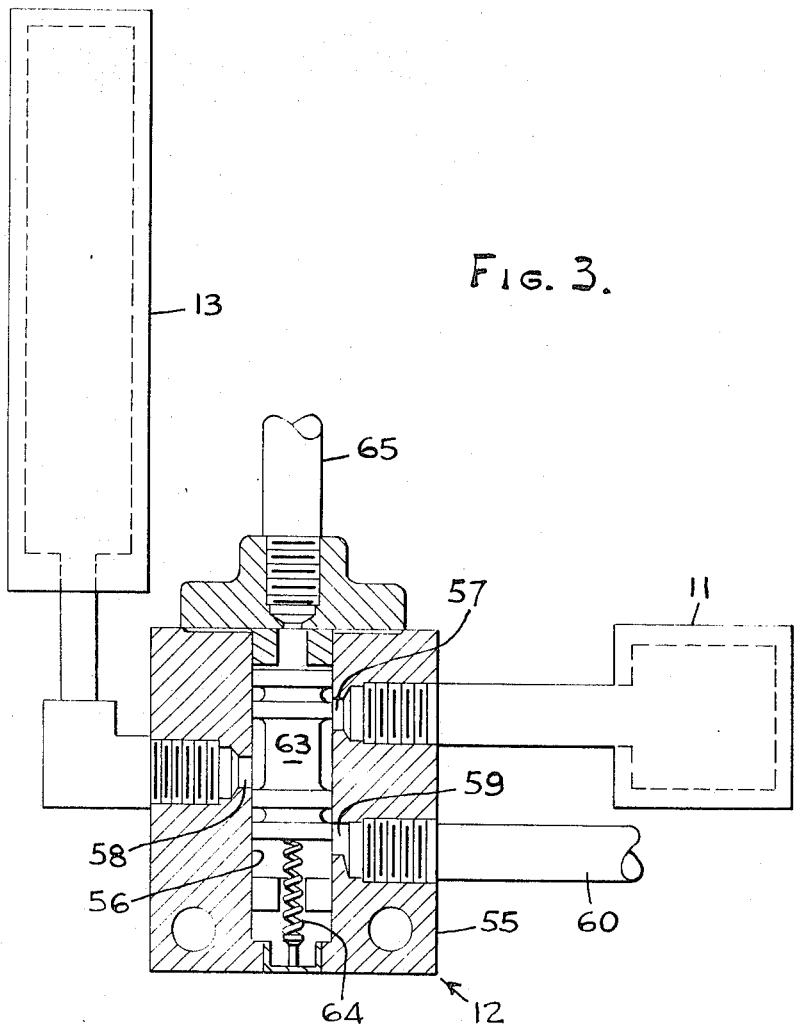
Fig. 3.
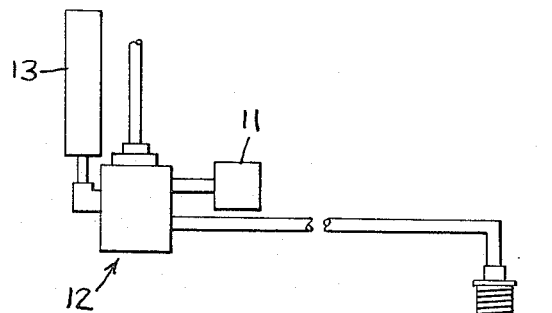
Fig. 2.
INVENTORS
HERBERT C. SNYDER
BY URBANO J. DeSANTIS
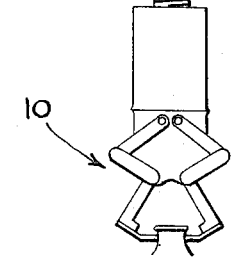
Christel & Bean
ATTORNEYS

3,787,197

APPARATUS FOR INTRODUCING MEASURED VOLUMES OF GASES TO INTERIORS OF GLASS CONTAINERS

BACKGROUND OF THE INVENTION

This invention relates to the injection of treatment gases into glass containers to treat the interior surfaces thereof.

It is common in the glass container industry to improve the chemical durability of the interior surfaces of the containers by treating the newly formed containers with gases which are usually toxic, such as sulfur dioxide. This treatment reduces the amount of alkali which can be released from the glass and is particularly important in the case of certain packaged products such as pharmaceuticals.

The most common method of treating the interiors of bottles to increase their chemical durability is to provide a downwardly directed blow tube which continuously emits a stream of $SO_2$. A conveyor carries the row of bottles beneath the open end of the blow tube and, while adequate gaseous treatment of the bottles is obtained in this manner, if a sufficient gas flow is maintained, it is obvious that the only useful portion of the gas is that which is emitted while a bottle is directly beneath the blow tube. The excess gas emitted from the blow tube requires that the process be carried on within a hood or closed chamber and the excess gas from the hood or chamber must be discharged to the atmosphere outside of the plant.

The noxious nature of $SO_2$ and other gases employed for this purpose is well known and current practices contribute to the pollution problem.

If it is attempted to trigger the gas flow on and off by means of a valve as the bottles pass along the conveyor line, timing problems greatly complicate the procedure and require a substantial lead and lag time in the discharge of treating gas so that there is still a substantial problem of containing and disposing of excess gas.

Due to the great numbers of bottles which pass along the conveyor line from the forming machines to the annealing lehrs, attempts to discharge the treating gas directly within each individual bottle unduly complicate the manufacturing process and render such methods impractical.

SUMMARY OF THE INVENTION

The present invention provides means for introducing measured quantities of $SO_2$ or other treatment gas directly within newly formed glass containers without interrupting or complicating the normal delivery of bottles from the forming machines to the annealing lehr.

According to the present invention, means are provided in conjunction with the take-out arms which transfer finished bottles from the blow molds to conveyors which transport the bottles to the annealing lehr. This is accomplished with only slight modification of the take-out arms and with relatively simple means for successively introducing measured quantities of treatment gas to the means which injects such measured quantities directly into the individual bottles, such injection means being, as indicated above, incorporated directly in the take-out arm mechanism of the forming machines.

BRIEF DESCRIPTION OF THE DRAWINGS

FIG. 2 is a schematic view showing the arrangement of elements for supplying treatment gas to a series of take-out mechanisms; and FIG. 3 is an elevational view, partly in cross section, showing valve means for providing measured individual quantities of gas for successive insertion into individual bottles.

DESCRIPTION OF THE ILLUSTRATED EMBODIMENT

Figure 1:
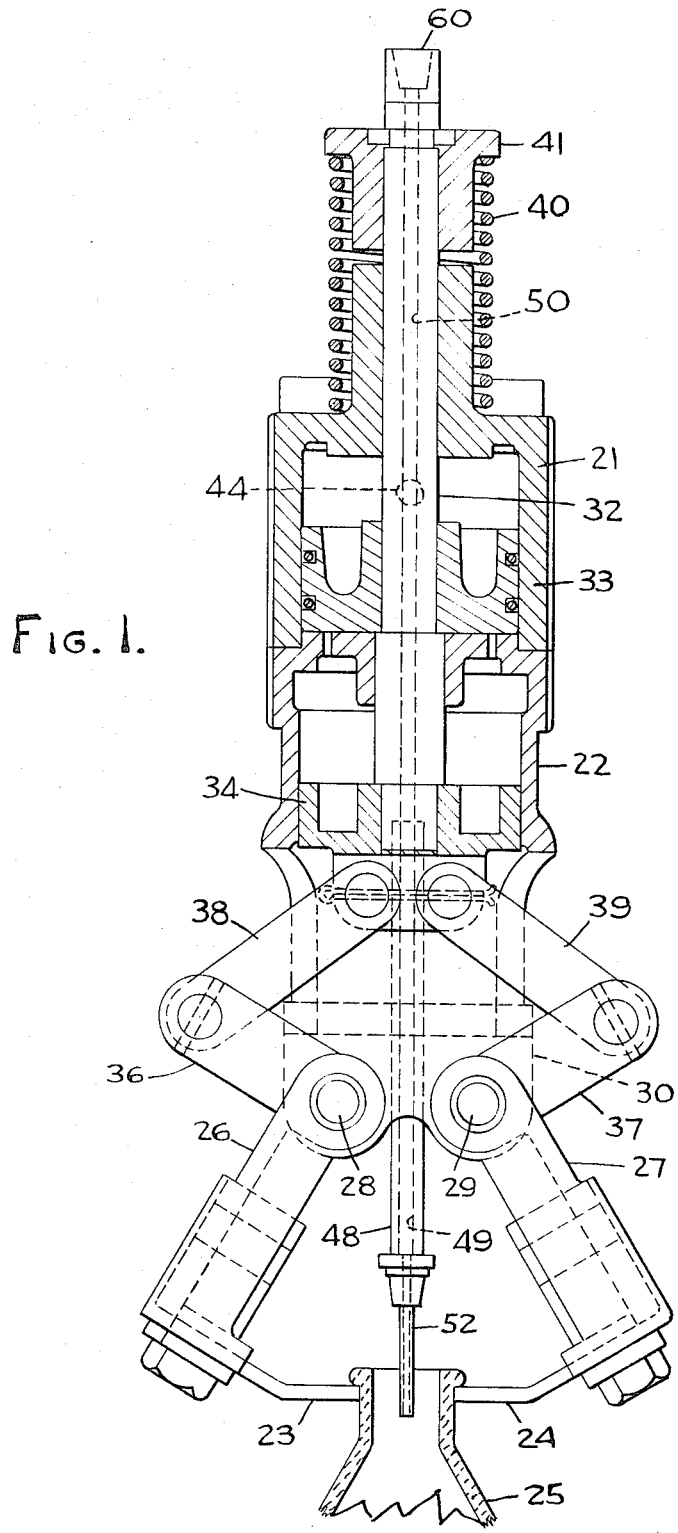
FIG. 1 is a vertical axial cross-sectional view of one form of take-out mechanism constructed in accordance with the present invention.

Referring first to the general schematic view, FIG. 2, the numeral 10 designates generally a take-out arm of the general type employed in Hartford-Empire I.S. bottle forming machines excepting that the arm is modified in accordance with the present invention as will be pointed out in detail later herein. The take-out arm moves bodily from a position wherein it grips a blown container at the blow mold and to a position wherein it deposits the container on a conveyor belt. There is a take-out arm for each section of the forming machine. All of this is well known to those familiar with the glass container manufacturing art.

A series of take-out arms serving a multiple section machine are supplied with treatment gas by means of a manifold 11 extending along past the several machine sections. Each take-out arm is served by a control valve designated generally 12 and a gas accumulator 13. The construction and operation of these elements will be described later herein in conjunction with a description of the more detailed showing of these elements in FIG. 3.

Referring now to the take-out mechanism illustrated in FIG. 1, a pair of cylindrical housing members 21 and 22 are connected in end-to-end relation and take-out jaws 23 and 24 which are adapted to engage the upper end of a glass bottle 25, are carried by tong holders 26 and 27 which are pivoted as at 28 and 29 to a bracket formation 30 carried by the lower end of cylinder member 22.

The numeral 32 designates an operating rod which is axially slidable in the upper end of cylindrical housing member 21 and has fixed thereto a piston 33 which is slidable in the cylindrical housing member 21.

Arms 36 and 37 are fixed to tong holders 26 and 27 and extend at approximately right angles therefrom, as shown in FIG. 1. Links 38 and 39 connect pivotally between the outer ends of arms 36 and 37 and bearing formations carried by a cylindrical block 34 which is fixed to the lower end of operating rod 32. Operating rod 32 is biased upwardly by a coil spring 40 which acts between the upper end of cylindrical housing member 21 and a retainer 41 which is fixed to the upper end of operating rod 32.

Downward movement of operating rod 32 pivots the tong holders 26 and 27 to cause engagement of the jaw members 23 and 24 with the upper end of a bottle (the position illustrated in FIG. 1). Such movement is produced against the resistance of coil spring 40 by operating air pressure which is introduced within cylindrical housing member 21 above piston 23 through a pressure inlet passage 44. The timing of the application of jaw closing pressure through passage 44 is by means of the timing drum of the forming machine in a manner well known in this art.

All of the foregoing construction is conventional in take-out mechanisms of Hartford-Empire I.S. machines. The modification of such mechanism in accordance with the present invention is as follows. As shown in FIG. 1, a tubular member 48 is fixed into the lower end of operating rod 32 and a bore 49 in tubular member 48 forms a continuation of a bore 50 which extends downwardly through operating rod 32 in the mechanism of the present invention. It will be noted that downward movement of operating rod 32 to close the jaws with respect to a bottle 25 automatically inserts an extension 52 of tubular member 48 into the top of bottle 25. After such insertion has been effected, a measured quantity of treatment gas is inserted into the bottle through the passages 50 and 49 and extension 52 in a manner which will now be described.

Referring to FIG. 3, control valve 12 comprises a housing 55 having a valve bore 56 and pressure passages connectingtherewith. One of the pressure passages designated 57 connects with manifold 11 to provide a supply of treatment gas under a given relatively constant pressure. A second passage 58 leads to a gas accumulator 13 and a passage 59 discharges into a flexible conduit 60 which connects with the upper end of the tubular passage 50 as at 60.

In the position shown in FIG. 3 a spool valve member 63 is in an upper position wherein passages 57 and 58 are connected and treatment gas flows from manifold 11 into accumulator 13 until the pressure in accumulator 13 reaches the relatively constant pressure level maintained in manifold 11. Valve 63 is normally urged to this position by a coil spring 64 but the valve is pressure-responsive and operating pressure for shifting the same is introduced to the valve body by way of a conduit 65 which triggers the valve under the control of the timing drum of the machine. When triggering pressure flows to the valve through conduit 65, valve 63 moves downwardly to cut off passage 57 from the gas supply and connect the passages 58 and 59,whereby a known measured quantity of gas under pressure in accumulator 13 flows through conduit 60, passages 50 and 49, and extension 52, into bottle 25.

This transfer of gas from accumulator 13 to the interior of a bottle 25 will be completed well before the point at which the jaws 23 and 24 open to release bottle 25 with the concomitant raising of rod 32 to lift extension 52 clear of the bottle 25.

From the foregoing, it will be seen that a known measured quantity of treatment gas will be delivered to the interior of each bottle directly as it leaves a blow mold of the forming machine in a very simple and effective manner, without any complication or delay in the bottle handling operation, and with only a minor modification of the take-out mechanism structure.

A preferred embodiment has been described herein and shown in the accompanying drawings to illustrate the underlying principles of the invention but it is to be understood that numerous modifications may be made without departing from the broad spirit and scope of the invention.

We claim:

1. Apparatus for applying gaseous surface treatment to the interiors of newly formed glass containers comprising a takeout mechanism and conduit means associated therewith for insertion into the open ends of containers to inject treatment gas thereinto, a source of said treatment gas under predetermined controlled pressure, an accumulator connected with said source for receiving gas under pressure from said source, a connection from said accumulator to said takeout mechanism conduit means, and valve means for alternately connecting said accumulator with said pressure source to equalize the pressure between the source and the accumulator, and then with said conduit means to successively receive a charge of treatment gas under pressure from said source and then discharge the same to said takeout mechanism conduit means.

2. Apparatus as in claim 1 wherein said conduit means is inserted in a container by engagement of the takeout mechanism with the container.

3. Apparatus as in claim 1 wherein said valve means is operated alternately in synchronism with the operation of said takeout mechanism.

4. Apparatus as in claim 2 wherein said valve means is operated alternately in synchronism with the operation of said takeout mechanism.

5. Apparatus as in claim 3 wherein said valve connects said accumulator with said takeout mechanism conduit means after the takeout mechanism engages a container and disconnects the accumulator from said conduit means before the container is released by the takeout mechanism.

* * * * *